Sept. 27, 1932.    B. F. BOUNDS    1,879,052
HITCH
Filed Aug. 27, 1930
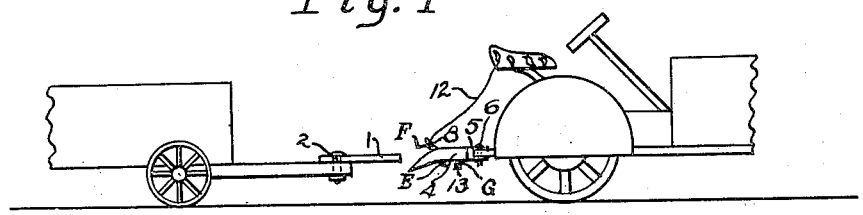
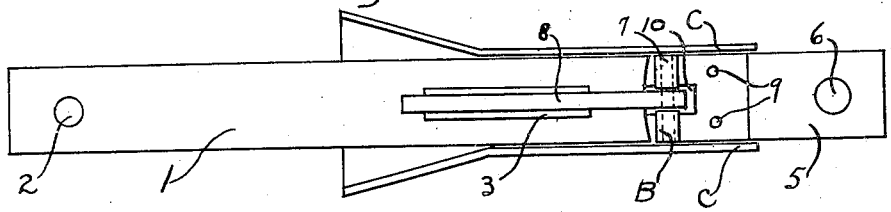
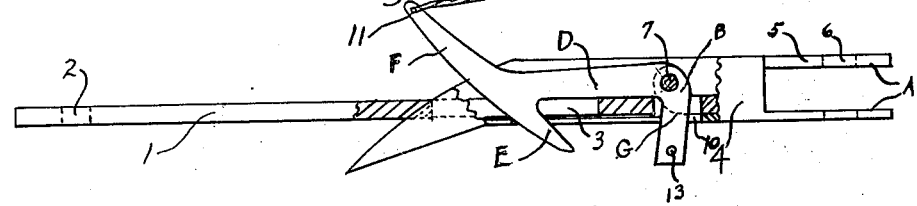
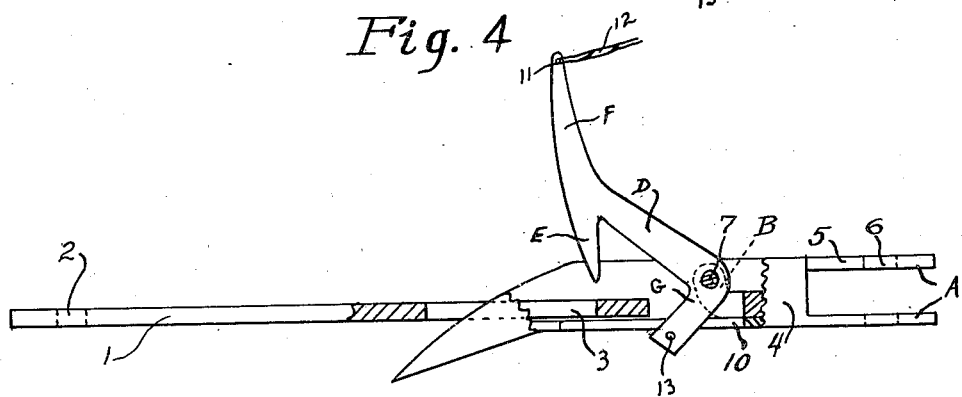
INVENTOR
Benjamin F. Bounds
BY
U. G. Charles
ATTORNEY Patented Sept. 27, 1932

1,879,052

UNITED STATES PATENT OFFICE

BENJAMIN F. BOUNDS, OF ROSSTON, OKLAHOMA, ASSIGNOR OF ONE-HALF TO ORVILLE WEAR, OF ENGLEWOOD, KANSAS

HITCH

Application filed August 27, 1930. Serial No. 478,008.

My invention relates to a hitch.

The object of my invention is to provide a hitch that will automatically engage.

A further object of my invention is to provide a hitch that has adjusting features at the time of coupling.

A still further object of my invention is to provide a hitch being so arranged that the contact will cause the latch to close by the force of the contact.

A still further object of my invention is to provide a hitch having means to align the abutting members as they come in contact with each other.

A still further object of my invention is to provide a hitch that is inexpensive, simple to operate, and effective in service, and may be applied to a tractor, automobile, or any other types of vehicles as a coupling means to farm machinery, trailers or the like.

These and other objects will hereinafter be more fully explained, reference being had to the accompanying drawing which forms a part of this specification, and in which like characters will apply to like parts in the different views.

Referring to the drawing.

Fig. 1 represents a fragmentary part of a tractor and a trailer aligned prior to making the hitch.

Fig. 2 is an enlarged plan view of the mechanism of the hitch.

Fig. 3 is a side view, parts being removed for convenience of illustration, and the hitch being made.

Fig. 4 is a similar view to Fig. 3, parts being removed for convenience of illustration, and showing the hitch disengaged for separation.

My invention herein disclosed consists of a draw bar 1 preferably secured to the vehicle bearing the load. The said bar having an aperture 2 for the insertion of a bolt that is placed in the tongue or draw bar of the said vehicle. While I have shown one aperture a plurality may be placed therein as the condition may require. In the opposite end of the bar is an elongated slot 3, terminating near the end thereof and extending toward the center as shown in Figs. 2, 3, and 4. The said slot adapted to receive a hook element hereinafter described.

Attached to a tractor or the like is a channeled bar member 4, the said bar having a clevis 5 secured to one end thereof, the said clevis being bifurcated, the legs of which as at A, are in parallelism and have apertures 6 in each end thereof and in registry, by which means the said bar is secured to a suitable draw bar arranged and attached to a tractor or the like and is free to rock when turning to either side. The other end of the clevis element is enlarged as at B and being apertured longitudinally to receive a pin 7 to which a coupling hook 8 hingedly engages and being positioned in a slot transversely and centrally in the enlarged portion B as shown in Fig. 2. The said clevis is secured to the channeled bar by rivets 9 as shown in Fig. 2. It being understood that the attached end of the clevis snugly engages between the flanges C—C of the draw bar.

The outer end of the last said draw bar is bent downward the sides of which diverge, and having a flange on each thereof and positioned at right angles thereto, by which means the free end of the bar 1 is guided to alignment and within the horizontal portion of the said bar 4. Intermediately positioned and longitudinally extending in the last said bar is an elongated slot 10, the sides of which are in registry with the sides of the slot 3 in the bar 1 when the hitch is made.

A hook element 8 previously mentioned has a shaft D and an obliquely and forwardly extending tongue E integrally connected, and an outwardly and upwardly extending portion F aligned therewith, by which means the hook is raised when the end of bar 1 contacts therewith as it enters the channel of the bar 4. The other end of the shaft has an approximate right angled bend downward as at G, and against which the end of the bar 1 will strike, by which means the said tongue is forced downward through the slots 3 and 10, and as the said bars are drawn from each other the said tongue will prevent separation as it will remain in its downward position by gravity.

As a means to raise the hook element from engagement an aperture 11, is placed in the end of the upper end of the portion aligned with the tongue, and in which a cord 12 is attached as shown in Fig. 1. The outer end of the said cord may be temporarily secured to the seat of a tractor so that the operator may have convenient access thereto when it is desired to break the coupling.

As a means to prevent excess upward movement of the hook element I have placed a pin 13 in the lower end of the right angled portion of the shaft as shown in Figs. 3 and 4, the said pin functioning as a stop when in contact with the lower side of the bar 4 as shown in Fig. 4.

It will be understood that the said bar elements must be moved toward each other sufficient for the outer end of the tongue to pass freely from the slot in bar 1 when disengagement is desired and this is accomplished by backing the tractor or the like gently toward the load being drawn.

It will also be understood that the downward and forward slanting position of the tongue is a means to avoid disengagement during the draft period.

Such modifications may be made as lie within the scope of the appended claim, and having fully described my invention what I claim as new and desire to secure by Letters Patent is:—

In a hitch, the combination of a channel bar, of a clevis axially aligned with the bar and secured thereto, of a hook element having a right angle bend and rockably positioned within the channel bar, the right angle bent portion having a pin near the outer end thereof to extend from each side thereof to function as a stop to restrict the upward movement of the hook when a coupling is being made, all substantially as shown.

In testimony whereof I affix my signature.

BENJAMIN F. BOUNDS.